US010365492B2

(12) United States Patent
Holland et al.

(10) Patent No.: US 10,365,492 B2
(45) Date of Patent: Jul. 30, 2019

(54) SYSTEMS, DEVICES, AND METHODS FOR BEAM COMBINING IN WEARABLE HEADS-UP DISPLAYS

(71) Applicant: North Inc., Kitchener (CA)

(72) Inventors: Lloyd Frederick Holland, Kitchener (CA); Joshua Moore, Elora (CA)

(73) Assignee: North Inc., Kitchener, ON (CA)

( * ) Notice: Subject to any disclaimer, the term of this patent is extended or adjusted under 35 U.S.C. 154(b) by 0 days.

(21) Appl. No.: 15/848,388

(22) Filed: Dec. 20, 2017

(65) Prior Publication Data

US 2018/0180886 A1   Jun. 28, 2018

Related U.S. Application Data

(60) Provisional application No. 62/438,725, filed on Dec. 23, 2016.

(51) Int. Cl.
*G02B 27/01*   (2006.01)
*G02B 26/08*   (2006.01)
(Continued)

(52) U.S. Cl.
CPC ..... *G02B 27/0172* (2013.01); *G02B 26/0816* (2013.01); *G02B 27/141* (2013.01);
(Continued)

(58) Field of Classification Search
CPC .............. G02B 27/0172; G02B 27/108; G02B 27/141; G02B 27/145; G02B 2027/0114;
(Continued)

(56) References Cited

U.S. PATENT DOCUMENTS 3,408,133 A   10/1968 Lee
3,712,716 A   1/1973 Cornsweet et al.
(Continued)

FOREIGN PATENT DOCUMENTS

JP   61-198892 A   9/1986
JP   10-319240 A   12/1998
(Continued)

OTHER PUBLICATIONS

Amitai, "P-27: A Two-dimensional Aperture Expander for Ultra-Compact, High-Performance Head-Worn Displays," *SID Symposium Digest of Technical Papers*, vol. 36, No. 1 (2005), pp. 360-363.
(Continued)

*Primary Examiner* — Frank G Font
(74) *Attorney, Agent, or Firm* — Thomas Mahon

(57) ABSTRACT

Systems, devices, and methods for beam combining are described. A monolithic beam combiner includes a solid volume of optically transparent material having two orthogonally positioned planar input surfaces, an output surface, and at least two planar dichroic reflectors positioned within the solid volume. Multiple light sources input light into the solid volume through the two planar input surfaces such that each light beam from a respective source is initially incident on one of the planar dichroic reflectors. The light is reflected by and transmitted through the reflectors and an aggregate beam is created. Because the reflectors are within an optically transparent material the beam combiner can be made more compact than a conventional beam combiner. This monolithic beam combiner is particularly well suited for use laser projectors and in wearable heads-up displays that employ laser projectors.

14 Claims, 5 Drawing Sheets

(51) Int. Cl.
  *G02B 27/14* (2006.01)
  *H04N 9/31* (2006.01)
  *G03B 21/20* (2006.01)
  *G03B 33/12* (2006.01)
  *G02B 27/10* (2006.01)
  *G02B 26/10* (2006.01)

(52) U.S. Cl.
  CPC ..... *G03B 21/2013* (2013.01); *G03B 21/2033* (2013.01); *G03B 33/12* (2013.01); *H04N 9/3129* (2013.01); *H04N 9/3161* (2013.01); *H04N 9/3164* (2013.01); *G02B 26/101* (2013.01); *G02B 27/108* (2013.01); *G02B 2027/014* (2013.01); *G02B 2027/0114* (2013.01); *G02B 2027/0178* (2013.01)

(58) Field of Classification Search
  CPC ...... G02B 2027/014; G02B 2027/0178; G02B 26/0816; G02B 26/101; G03B 21/2013; G03B 21/2033; G03B 33/12; H04N 9/3129; H04N 9/3161; H04N 9/3164
  USPC ....... 359/632, 633, 634, 636; 353/31, 81, 84
  See application file for complete search history.

(56) References Cited

U.S. PATENT DOCUMENTS

| | | | |
|---|---|---|---|
| 4,978,213 A | 12/1990 | El Hage | |
| 5,103,323 A | 4/1992 | Magarinos et al. | |
| 5,231,674 A | 7/1993 | Cleveland et al. | |
| 5,467,104 A | 11/1995 | Furness, III et al. | |
| 5,589,956 A | 12/1996 | Morishima et al. | |
| 5,596,339 A | 1/1997 | Furness, III et al. | |
| 5,742,421 A | 4/1998 | Wells et al. | |
| 6,008,781 A | 12/1999 | Furness, III et al. | |
| 6,027,216 A | 2/2000 | Guyton et al. | |
| 6,184,847 B1 | 2/2001 | Fateh et al. | |
| 6,204,829 B1 | 3/2001 | Tidwell | |
| 6,236,476 B1 | 5/2001 | Son et al. | |
| 6,317,103 B1 | 11/2001 | Furness, III et al. | |
| 6,353,503 B1 | 3/2002 | Spitzer et al. | |
| 6,377,277 B1 | 4/2002 | Yamamoto | |
| 6,639,570 B2 | 10/2003 | Furness, III et al. | |
| 6,972,734 B1 | 12/2005 | Ohshima et al. | |
| 7,473,888 B2 | 1/2009 | Wine et al. | |
| 7,640,007 B2 | 12/2009 | Chen et al. | |
| 7,684,105 B2 | 3/2010 | Lamontagne et al. | |
| 7,747,113 B2 | 6/2010 | Mukawa et al. | |
| 7,773,111 B2 | 8/2010 | Cleveland et al. | |
| 7,850,306 B2 | 12/2010 | Uusitalo et al. | |
| 7,925,100 B2 | 4/2011 | Howell et al. | |
| 7,927,522 B2 | 4/2011 | Hsu | |
| 8,120,828 B2 | 2/2012 | Schwerdtner | |
| 8,179,604 B1 | 5/2012 | Prada Gomez et al. | |
| 8,188,937 B1 | 5/2012 | Amafuji et al. | |
| 8,355,671 B2 | 1/2013 | Kramer et al. | |
| 8,560,976 B1 | 10/2013 | Kim | |
| 8,634,119 B2 | 1/2014 | Bablumyan et al. | |
| 8,666,212 B1 | 3/2014 | Amirparviz | |
| 8,704,882 B2 | 4/2014 | Turner | |
| 8,922,481 B1 | 12/2014 | Kauffmann et al. | |
| 8,922,898 B2 | 12/2014 | Legerton et al. | |
| 8,970,571 B1 | 3/2015 | Wong et al. | |
| 8,971,023 B2 | 3/2015 | Olsson et al. | |
| 9,086,687 B2 | 7/2015 | Park et al. | |
| 9,135,708 B2 | 9/2015 | Ebisawa | |
| 9,477,079 B2 | 10/2016 | Bailey et al. | |
| 9,766,449 B2 | 9/2017 | Bailey et al. | |
| 2001/0033402 A1 | 10/2001 | Popovich | |
| 2002/0003627 A1 | 1/2002 | Rieder | |
| 2002/0007118 A1 | 1/2002 | Adachi et al. | |
| 2002/0030636 A1 | 3/2002 | Richards | |
| 2002/0093701 A1 | 7/2002 | Zhang et al. | |
| 2002/0120916 A1 | 8/2002 | Snider, Jr. | |
| 2004/0174287 A1 | 9/2004 | Deak | |
| 2005/0012715 A1 | 1/2005 | Ford | |
| 2006/0238707 A1 | 10/2006 | Elvesjo et al. | |
| 2007/0078308 A1 | 4/2007 | Daly | |
| 2007/0132785 A1 | 6/2007 | Ebersole, Jr. et al. | |
| 2008/0273568 A1* | 11/2008 | Schulz | G02B 27/104 372/50.23 |
| 2009/0109241 A1 | 4/2009 | Tsujimoto | |
| 2009/0179824 A1 | 7/2009 | Tsujimoto et al. | |
| 2009/0207464 A1 | 8/2009 | Wiltshire et al. | |
| 2009/0258669 A1 | 10/2009 | Nie et al. | |
| 2009/0322653 A1 | 12/2009 | Putilin et al. | |
| 2010/0053555 A1 | 3/2010 | Enriquez et al. | |
| 2010/0060551 A1 | 3/2010 | Sugiyama et al. | |
| 2010/0142015 A1 | 6/2010 | Kuwahara et al. | |
| 2010/0149073 A1 | 6/2010 | Chaum et al. | |
| 2010/0150415 A1 | 6/2010 | Atkinson et al. | |
| 2010/0239776 A1 | 9/2010 | Yajima et al. | |
| 2011/0134949 A1* | 6/2011 | O'Shaughnessy | G01N 21/255 372/34 |
| 2012/0002256 A1 | 1/2012 | Lacoste et al. | |
| 2012/0139817 A1 | 6/2012 | Freeman | |
| 2012/0169752 A1 | 7/2012 | Kurozuka | |
| 2012/0182309 A1 | 7/2012 | Griffin et al. | |
| 2012/0188158 A1 | 7/2012 | Tan et al. | |
| 2012/0249797 A1 | 10/2012 | Haddick et al. | |
| 2012/0290401 A1 | 11/2012 | Neven | |
| 2012/0302289 A1 | 11/2012 | Kang | |
| 2013/0009853 A1 | 1/2013 | Hesselink et al. | |
| 2013/0016292 A1 | 1/2013 | Miao et al. | |
| 2013/0016413 A1 | 1/2013 | Saeedi et al. | |
| 2013/0088413 A1 | 4/2013 | Raffle et al. | |
| 2013/0135722 A1 | 5/2013 | Yokoyama | |
| 2013/0165813 A1 | 6/2013 | Chang et al. | |
| 2013/0169560 A1 | 7/2013 | Cederlund et al. | |
| 2013/0198694 A1 | 8/2013 | Rahman et al. | |
| 2013/0215235 A1 | 8/2013 | Russell | |
| 2013/0222384 A1 | 8/2013 | Futterer | |
| 2013/0265437 A1 | 10/2013 | Thörn et al. | |
| 2013/0285901 A1 | 10/2013 | Lee et al. | |
| 2013/0300652 A1 | 11/2013 | Raffle et al. | |
| 2013/0332196 A1 | 12/2013 | Pinsker | |
| 2013/0335302 A1 | 12/2013 | Crane et al. | |
| 2014/0045547 A1 | 2/2014 | Singamsetty et al. | |
| 2014/0125760 A1 | 5/2014 | Au et al. | |
| 2014/0198034 A1 | 7/2014 | Bailey et al. | |
| 2014/0198035 A1 | 7/2014 | Bailey et al. | |
| 2014/0202643 A1 | 7/2014 | Hikmet et al. | |
| 2014/0204455 A1 | 7/2014 | Popovich et al. | |
| 2014/0204465 A1 | 7/2014 | Yamaguchi | |
| 2014/0226193 A1 | 8/2014 | Sun | |
| 2014/0232651 A1 | 8/2014 | Kress et al. | |
| 2014/0285429 A1 | 9/2014 | Simmons | |
| 2014/0368896 A1 | 12/2014 | Nakazono et al. | |
| 2015/0036221 A1 | 2/2015 | Stephenson | |
| 2015/0156716 A1 | 6/2015 | Raffle et al. | |
| 2015/0205126 A1 | 7/2015 | Schowengerdt | |
| 2015/0205134 A1 | 7/2015 | Bailey et al. | |
| 2015/0268821 A1 | 9/2015 | Ramsby et al. | |
| 2015/0325202 A1 | 11/2015 | Lake et al. | |
| 2015/0362734 A1 | 12/2015 | Moser et al. | |
| 2015/0378162 A1 | 12/2015 | Bailey et al. | |
| 2016/0033771 A1 | 2/2016 | Tremblay et al. | |
| 2016/0202081 A1 | 7/2016 | Debieuvre et al. | |
| 2016/0238845 A1* | 8/2016 | Alexander | G03H 1/2645 |
| 2016/0274362 A1* | 9/2016 | Tinch | G02B 27/0172 |
| 2016/0274365 A1 | 9/2016 | Bailey et al. | |
| 2016/0274758 A1 | 9/2016 | Bailey | |
| 2016/0327796 A1 | 11/2016 | Bailey et al. | |
| 2016/0327797 A1 | 11/2016 | Bailey et al. | |
| 2016/0334618 A1* | 11/2016 | Hargis | G02B 26/0875 |
| 2016/0349514 A1 | 12/2016 | Alexander et al. | |
| 2016/0349515 A1 | 12/2016 | Alexander et al. | |
| 2016/0349516 A1 | 12/2016 | Alexander et al. | |
| 2016/0377865 A1 | 12/2016 | Alexander et al. | |
| 2016/0377866 A1 | 12/2016 | Alexander et al. | |
| 2017/0068095 A1 | 3/2017 | Holland et al. | |
| 2017/0097753 A1 | 4/2017 | Bailey et al. | |
| 2017/0115483 A1 | 4/2017 | Aleem et al. | |

(56) References Cited

U.S. PATENT DOCUMENTS

| | | | |
|---|---|---|---|
| 2017/0153701 | A1 | 6/2017 | Mahon et al. |
| 2017/0205876 | A1 | 7/2017 | Vidal et al. |
| 2017/0212290 | A1 | 7/2017 | Alexander et al. |
| 2017/0212349 | A1 | 7/2017 | Bailey et al. |
| 2017/0219829 | A1 | 8/2017 | Bailey |
| 2017/0299956 | A1 | 10/2017 | Holland et al. |
| 2017/0343796 | A1 | 11/2017 | Bailey et al. |
| 2017/0343797 | A1 | 11/2017 | Bailey et al. |
| 2018/0007255 | A1 | 1/2018 | Tang |

FOREIGN PATENT DOCUMENTS

| | | |
|---|---|---|
| JP | 2013-127489 A | 6/2013 |
| JP | 2013-160905 A | 8/2013 |
| KR | 10-2004-0006609 A | 1/2014 |
| WO | 2014/155288 A2 | 10/2014 |
| WO | 2015/123775 A1 | 8/2015 |

OTHER PUBLICATIONS

Ayras et al., "Exit pupil expander with a large field of view based on diffractive optics," *Journal of the SID*, vol. 17, No. 8 (2009), pp. 659-664.

Chellappan et al., "Laser-based display: a review," *Applied Optics*, vol. 49, No. 25 (2010), pp. 79-98.

Cui et al., "Diffraction from angular multiplexing slanted volume hologram gratings," *Optik*, vol. 116 (2005), pp. 118-122.

Curatu et al., "Dual Purpose Lens for an Eye-tracked Projection Head-Mounted Display," *International Optical Design Conference 2006*, SPIE-OSA, vol. 6342 (2007), pp. 63420X-1-63420X-7.

Curatu et al., "Projection-based head-mounted display with eye-tracking capabilities," *Proc. of SPIE*, vol. 5875 (2005), pp. 58750J-1-58750J-9.

Essex, "Tutorial on Optomechanical Beam Steering Mechanisms," College of Optical Sciences, University of Arizona, 2006, 8 pages.

Fernandez et al., "Optimization of a thick polyvinyl alcohol-acrylamide photopolymer for data storage using a combination of angular and peristrophic holographic multiplexing," *Applied Optics*, vol. 45, No. 29 (2006), pp. 7661-7666.

Hainich et al., "Chapter 10: Near-Eye Displays," in: *Displays—Fundamentals & Applications*, 2011, pp. 439-503.

Hornstein et al., "Maradin's Micro-Mirror—System Level Synchronization Notes," *SID 2012 Digest* (2012), pp. 981-984.

International Search Report and Written Opinion, dated Apr. 25, 2017, for International Application No. PCT/US2016/067246, 10 pages.

International Search Report and Written Opinion, dated Dec. 8, 2016, for International Application No. PCT/US2016/050225, 15 pages.

International Search Report and Written Opinion, dated Jan. 18, 2017, for International Application No. PCT/US2016/054852, 12 pages.

International Search Report and Written Opinion, dated Jun. 8, 2016, for International Application No. PCT/US2016/018293, 17 pages.

International Search Report and Written Opinion, dated Jun. 8, 2016, for International Application No. PCT/US2016/018298, 14 pages.

International Search Report and Written Opinion, dated Jun. 8, 2016, for International Application No. PCT/US2016/018299, 12 pages.

International Search Report and Written Opinion, dated Oct. 13, 2017, for International Application No. PCT/US2017/040323, 16 pages.

International Search Report and Written Opinion, dated Sep. 28, 2017, for International Application No. PCT/US2017/027479, 13 pages.

Itoh et al., "Interaction-free calibration for optical see-through head-mounted displays based on 3D eye localization," *2014 IEEE Symposium on 3D User Interfaces* (3DUI), (2014), pp. 75-82.

Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.

Kessler, "Optics of Near to Eye Displays (NEDs)," *Oasis 2013*, Tel Aviv, Israel, Feb. 19, 2013, 37 pages.

Kress et al., "A review of head-mounted displays (HMD) technologies and applications for consumer electronics," *Proc. of SPIE*, vol. 8720 (2013), pp. 87200A-1-87200A-13.

Kress et al., "Diffractive and Holographic Optics as Optical Combiners in Head Mounted Displays," *Proceedings of the 2013 ACM Conference on Pervasive and Ubiquitous Computing Adjunct Publication*, Zurich, Switzerland, Sep. 8-12, 2013, pp. 1479-1482.

Kress, "Optical architectures for see-through wearable displays," *Bay Area—SID Seminar*, Bay Area, Apr. 30, 2014, 156 pages.

Levola, " 7.1: Invited Paper: Novel Diffractive Optical Components for Near to Eye Displays," *SID Symposium Digest of Technical Papers*, vol. 37, No. 1 (2006), pp. 64-67.

Liao et al., "The Evolution of MEMS Displays," *IEEE Transcations on Industrial Electronics*, vol. 56, No. 4 (2009), pp. 1057-1065.

Lippert, "Chapter 6: Display Devices: RSD (Retinal Scanning Display)," in: *The Avionics Handbook*, 2001, 8 pages.

Majaranta et al., "Chapter 3: Eye-Tracking and Eye-Based Human-Computer Interaction," in *Advances in Physiological Computing*, 2014, pp. 39-65.

Merriam-Webster, "Radio Frequencies" retrieved from https://www.merriam-webster.comitable/collegiate/radiofre.htm, retrieved on Jul. 12, 2017, 2 pages.

Schowengerdt et al., "Stereoscopic retinal scanning laser display with integrated focus cues for ocular accommodation," *Proc. of SPIE-IS&T Electronic Imaging* , vol. 5291 (2004), pp. 366-376.

Silverman et al., "58.5L: Late-News Paper: Engineering a Retinal Scanning Laser Display with Integrated Accommodative Depth Cues," *SID 03 Digest*, (2003), pp. 1538-1541.

Takatsuka et al., "Retinal projection display using diffractive optical element," *Tenth International Conference on Intelligent Information Hiding and Multimedia Signal Processing*, IEEE, (2014), pp. 403-406.

Urey et al., "Optical performance requirements for MEMS-scanner based microdisplays," *Conf. on MOEMS and Miniaturized Systems*, SPIE, vol. 4178 (2000), pp. 176-185.

Urey, "Diffractive exit-pupil expander for display applications," *Applied Optics*, vol. 40, No. 32 (2001), pp. 5840-5851.

Viirre et al., "The Virtual Retina Display: A New Technology for Virtual Reality and Augmented Vision in Medicine," *Proc. of Medicine Meets Virtual Reality* (1998), pp. 252-257.

\* cited by examiner

SYSTEMS, DEVICES, AND METHODS FOR BEAM COMBINING IN WEARABLE HEADS-UP DISPLAYS

BACKGROUND

Technical Field

The present systems, devices, and methods generally relate to beam combining and particularly relate to beam combining within laser projectors in wearable heads-up displays.

Description of the Related Art

Laser Projectors

A projector is an optical device that projects or shines a pattern of light onto another object (e.g., onto a surface of another object, such as onto a projection screen) in order to display an image or video on that other object. A projector necessarily includes a light source, and a laser projector is a projector for which the light source comprises at least one laser. The at least one laser is temporally modulated to provide a pattern of laser light and usually at least one controllable mirror is used to spatially distribute the modulated pattern of laser light over a two-dimensional area of another object. The spatial distribution of the modulated pattern of laser light produces an image at or on the other object. In conventional laser projectors, the at least one controllable mirror may include: a single digital micro (e.g., a microelectromechanical system ("MEMS") based digital micromirror) that is controllably rotatable or deformable in two dimensions, or two digital micromirrors that are each controllably rotatable or deformable about a respective dimension, or a digital light processing ("DLP") chip comprising an array of digital micromirrors.

In a conventional laser projector comprising a RGB laser module with a red laser diode, a green laser diode, and a blue laser diode the individual red laser beam, green laser beam, and blue laser beam may be combined into an aggregate laser beam such that each laser beam impinges on the at least one controllable mirror with substantially the same spot size (the two dimensional area of the cross section of the laser beam at any point along the length of the beam) and with substantially the same rate of convergence (so that all laser beams will continue to have substantially the same spot size as they propagate away from the laser projector towards, e.g., a projection screen). In a conventional laser projector, it is usually possible to come up with such a configuration for all optical elements because the overall form factor of the device is not a primary design consideration. However, in applications for which the form factor of the laser projector is an important design element, such as a wearable heads-up display, it can be very challenging to find a configuration for the laser diodes, the beam combining elements, and the at least one controllable mirror that sufficiently aligns the laser beams (at least in terms of spot size, spot position, and rate of convergence) while satisfying the form factor constraints.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

BRIEF SUMMARY

Beam Combiners

Beam combiners employ reflective mirrors and dichroic filters to combine multiple lights beams into an aggregate beam. These dichroic filters generally comprise dichroic coatings on an optically transparent material, usually glass, and have a refractive index that is different than the refractive index of the air the light passes through before impinging on the filter. Light passing through a filter is bent and the emergent ray exits the mirror on a path that is displaced from the path of the incident ray. This phenomenon is shown in FIG. 1. FIG. 1 is a schematic diagram of an exemplary beam combiner 100. Beam combiner 100 comprises a reflective mirror 111, a first dichroic filter 112, a second dichroic filter 113, and a third dichroic filter 114. Light 121 from a first source is incident on reflective mirror 111 and is reflected towards first dichroic filter 112 (shown as arrow 122). Light is shown as a single arrow for simplicity, in actuality the spot size of the beam would cover a larger portion of the surface of the mirror or filter. Because the refractive index of the air and the refractive index of the first dichroic filter 112 are different, light 122 is refracted (dashed line) as it passes through first dichroic filter 112 and, therefore, exits first dichroic filter 112 on a "lower" path then the incident path. FIG. 1 shows the beams moving "lower" on the page as each subsequent passage of light from air into filter and back into air occurs, however, the direction of the displacement of the emergent path from the incident path is dependent on the specific orientation of the filter within the laser projector and therefore the beam may move higher, lower, to the right, to the left, etc. Light 123 from a second source is incident on first dichroic filter 112 and is reflected towards second dichroic filter 113. Light 124 comprises light from the first source and light from the second source. At second dichroic filter 113 light 124 is refracted (dashed line) and exits second dichroic filter 113 on a "lower" path then the incident path. Light 125 from a third source is incident on second dichroic filter 113 and is reflected towards third dichroic filter 114. Light 126 comprises light from the first source, light from the second source, and light from the third source. At third dichroic filter 114 light 126 is refracted (dashed line) and exits third dichroic filter 114 on a "lower" path then the incident path. Light 127 from a fourth source is incident on second dichroic filter 111 and is reflected and combined with light from the first source, light from the second source, and light from the third source into aggregate beam 128 to be projected from the laser projector to a surface. The refraction of light as it passes through the beam combiner necessitates staggering the mirror and filters so that they "step down" as the beam moves "lower" to ensure that no light is lost and that the individual beams from each light source are aligned properly (i.e., completely overlapped). This results in a bulky beam combining apparatus that is not ideal for use wearable heads-up display where space is at a premium. There is a need in the art for more compact beam combiners that can be employed in wearable heads-up displays so that the wearable heads-up display is capable of providing high-quality images to the user without limiting the user's ability to see their external environment.

A monolithic beam combiner may be summarized as including: a solid volume of optically transparent material that includes at least a first planar surface and which has a principal axis; a planar reflector physically coupled to the solid volume, wherein a longitudinal axis of the solid volume passes through the planar reflector and the planar reflector is oriented at an at least approximately 45° angle relative to the first planar surface, the planar reflector reflective of light in at least a first waveband; and at least a first planar dichroic reflector within the solid volume, the first planar dichroic reflector spaced apart from the planar reflector along the longitudinal axis of the solid volume and oriented parallel to the planar reflector at an at least approximately 45° angle relative to the first planar surface, the first planar dichroic reflector transmissive of light in the first waveband and reflective of light in a second waveband. The longitudinal axis of the monolithic beam combiner may be parallel to the first planar surface of the solid volume wherein the planar reflector and the first planar dichroic reflector are each oriented at an at least approximately 45° angle to the longitudinal axis in a first dimension and oriented at an at least approximately 90° angle to the longitudinal axis in a second dimension, the second dimension orthogonal to the first dimension. The planar reflector and the at least a first planar dichroic reflector may be coaxially aligned. The planar reflector may be within the solid volume.

A shape of the solid volume may be a parallelepiped. The shape of the solid volume may be a right trapezoidal prism, wherein the planar reflector is carried on a surface of the right trapezoidal prism that is oriented at an at least approximately 45° angle relative to the first planar surface of the right trapezoidal prism.

The monolithic beam combiner may further include a second planar dichroic reflector within the solid volume, wherein the second planar dichroic reflector is spaced apart from the first planar dichroic reflector along the longitudinal axis of the solid volume and oriented parallel to the planar reflector at an at least approximately 45° angle relative to the first planar surface, the second planar dichroic reflector reflective of light in a third waveband, transmissive of light in the first waveband, and transmissive of light in the second waveband. The monolithic beam combiner may further include at least a third planar dichroic reflector within the solid volume, wherein the third planar dichroic reflector is spaced apart from the second planar dichroic reflector along the longitudinal axis of the solid volume and oriented parallel to the planar reflector at an at least approximately 45° angle relative to the first planar surface, the third planar dichroic reflector reflective of light in a fourth waveband, transmissive of light in the first waveband, transmissive of light in the second waveband, and transmissive of light in the third waveband.

A first dimension of both the planar reflector and the first planar dichroic reflector may be oriented at an at least approximately 45° angle relative to the first planar surface and a second dimension of both the planar reflector and the first planar dichroic reflector may be at least approximately parallel to the first planar surface, the first dimension and the second dimension orthogonal to one another.

A laser projector may be summarized as including: a first laser diode operable to output laser light in a first waveband; at least a second laser diode, the second laser diode operable to output laser light in a second waveband, wherein the first waveband is different from the second waveband and the first waveband and second waveband do not overlap; at least one controllable mirror positioned and oriented to scan laser light output by the first laser diode and the at least a second laser diode over a field of view of an eye of a user; and a monolithic beam combiner comprising: a solid volume of optically transparent material that includes a planar input surface and an output surface, wherein the first laser diode is positioned and oriented to direct laser light in the first waveband at the planar input surface at an at least approximately 90° angle and the second laser diode is positioned and oriented to direct laser light in the second waveband at the planar input surface at an at least approximately 90° angle; a planar reflector physically coupled to the solid volume, the planar reflector reflective of light in at least the first waveband and oriented at an at least approximately 45° angle relative to the planar input surface; and at least a first planar dichroic reflector within the solid volume, the first planar dichroic reflector transmissive of light in the first waveband and reflective of light in the second waveband and oriented parallel to the planar reflector at an at least approximately 45° angle relative to the planar input surface, wherein: the planar reflector is positioned to receive laser light in the first waveband from the first laser diode and reflect the laser light in the first waveband through the at least a first planar dichroic reflector towards the output surface of the solid volume; the first planar dichroic reflector is positioned within the solid volume to receive laser light in the first waveband from the planar reflector and transmit the laser light in the first waveband towards the output surface and to receive laser light in the second waveband from the second laser diode and reflect the laser light in the second waveband towards the output surface; and the output surface is oriented to output an aggregate laser beam comprising laser light in the first waveband and at least laser light in the second waveband from the solid volume of optically transparent material.

The output surface of the solid volume may be a planar output surface that is orthogonal to the planar input surface, wherein: the planar reflector is oriented at an at least approximately 45° angle relative to the planar output surface; the first planar dichroic reflector is oriented at an at least approximately 45° angle relative to the planar output surface; the planar reflector is positioned to receive laser light in the first waveband from the first laser diode and reflect the laser light in the first waveband through the at least a first planar dichroic reflector towards the planar output surface of the solid volume at an at least approximately 90° angle relative to the planar output surface; the first planar dichroic reflector is positioned to receive laser light in the first waveband from the planar reflector and transmit the laser light in the first waveband towards the planar output surface at the at least approximately 90° angle relative to the planar output surface; and the first planar dichroic reflector is positioned to receive laser light in the second waveband from the second laser diode and reflect the laser light in the second waveband towards the planar output surface of the solid volume at an at least approximately 90° angle relative to the planar output surface.

A shape of the solid volume may be a parallelepiped. The shape of the solid volume may be a right trapezoidal prism wherein the planar reflector is carried on a surface of the right trapezoidal prism that is oriented at an at least approximately 45° angle relative to the planar input surface of the right trapezoidal prism. The planar reflector may be within the solid volume.

The laser projector may further include a third laser diode to output laser light in a third waveband, wherein the third waveband is discrete from the first waveband and the second waveband, and wherein the monolithic beam combiner further comprises a second planar dichroic reflector, wherein: the second planar dichroic reflector is transmissive of light in the first waveband, transmissive of light in the second waveband, and reflective of light in the third waveband and oriented parallel to the planar reflector at an at least approximately 45° angle relative to the planar input surface; the second planar dichroic reflector is positioned to receive, from the first planar dichroic reflector, laser light in the first waveband and laser light in the second waveband and to transmit the laser light in the first waveband and the laser light in the second waveband towards the output surface; the second planar dichroic reflector is positioned to receive laser light in the third waveband from the third laser diode and reflect the laser light in the third waveband towards the output surface of the solid volume; and the output surface is oriented to output an aggregate laser beam comprising laser light in the first waveband, laser light in the second waveband, and laser light in the third waveband. The laser projector may further include a fourth laser diode to output laser light in a fourth waveband, wherein the fourth waveband is discrete from the first waveband, the second waveband, and the third waveband, and wherein the monolithic beam combiner further comprises a third planar dichroic reflector, wherein: the third planar dichroic reflector is transmissive of light in the first waveband, transmissive of light in the second waveband, transmissive of light in the third waveband, and reflective of light in the fourth waveband and oriented parallel to the planar reflector at an at least approximately 45° angle relative to the planar input surface; the third planar dichroic reflector is positioned to receive, from the second planar dichroic reflector, laser light in the first waveband, laser light in the second waveband, and laser light in the third waveband and to transmit the laser light in the first waveband, the laser light in the second waveband, and the laser light in the third waveband towards the output surface; the third planar dichroic reflector is positioned to receive laser light in the fourth waveband from the fourth laser diode and reflect the laser light in the fourth waveband towards the output surface of the solid volume; and the output surface is oriented to output an aggregate laser beam comprising laser light in the first waveband, laser light in the second waveband, laser light the third waveband, and laser light in the fourth waveband. The first laser diode may be a red laser diode operable to output red laser light wherein the first waveband comprises red wavelengths, the second laser diode may be a green laser diode operable to output green laser light wherein the second waveband comprises green wavelengths, the third laser diode may be a blue laser diode operable to output blue laser light wherein the third waveband comprises blue wavelengths, and the fourth laser diode may be an infrared laser diode operable to output infrared laser light wherein the fourth waveband comprises infrared wavelengths, and wherein the planar reflector reflects at least red laser light, the first planar dichroic reflector transmits red laser light and reflects green laser light, the second planar dichroic reflector transmits red laser light and green laser light and reflects blue laser light, and the third planar dichroic reflector transmits red laser light, green laser light, and blue laser light and reflects infrared laser light.

A wearable heads-up display (WHUD) may be summarized as including: a transparent combiner; a support structure that in use is worn on the head of user, and which positions the transparent combiner within a field of view of the user when the support structure is worn on the head of the user; a laser projector carried by the support structure, the laser projector comprising: a first laser diode operable to output laser light in a first waveband; at least a second laser diode, the second laser diode operable to output laser light in a second waveband, wherein the first waveband is different from the second waveband and the first waveband and second waveband do not overlap; at least one controllable mirror operable to scan the laser light over the transparent combiner in a field of view of an eye of a user; and a monolithic beam combiner comprising: a solid volume of optically transparent material that includes a planar input surface and an output surface wherein the first laser diode is positioned and oriented to direct laser light in the first waveband at the planar input surface at an at least approximately 90° angle and the second laser diode is positioned and oriented to direct laser light in the second waveband at the planar input surface at an at least approximately 90° angle; a planar reflector physically coupled to the solid volume, wherein the planar reflector is reflective of light in at least the first waveband and oriented at an at least approximately 45° angle relative to the planar input surface; and at least a first planar dichroic reflector within the solid volume, the first planar dichroic reflector transmissive of light in the first waveband and reflective of light in the second waveband and oriented parallel to the planar reflector at an at least approximately 45° angle relative to the planar input surface, wherein: the planar reflector is positioned to receive laser light in the first waveband from the first laser diode and reflect the laser light in the first waveband through the at least a first planar dichroic reflector towards the output surface; the first planar dichroic reflector is positioned to receive laser light in the first waveband from the planar reflector and transmit the laser light in the first waveband towards the output surface; the first planar dichroic reflector is positioned to receive laser light in the second waveband from the second laser diode and reflect the laser light in the second waveband towards the output surface; and the output surface is oriented to output an aggregate laser beam comprising laser light in the first waveband and at least laser light in the second waveband.

The monolithic beam combiner may have a principal axis that is parallel to the first planar surface of the solid volume and the planar reflector and the first planar dichroic reflector are each oriented at an at least approximately 45° angle to the longitudinal axis in a first dimension and oriented at an at least approximately 90° angle to the longitudinal axis in a second dimension, the second dimension orthogonal to the first dimension.

The output surface of the solid volume may be a planar output surface that is orthogonal to the planar input surface, wherein: the planar reflector is oriented at an at least approximately 45° angle relative to the planar output surface; the first planar dichroic reflector is oriented at an at least approximately 45° angle relative to the planar output surface; the planar reflector is positioned to receive laser light in the first waveband from the first laser diode and reflect the laser light in the first waveband through the at least a first planar dichroic reflector towards the planar output surface of the solid volume at an at least approximately 90° angle relative to the planar output surface; the first planar dichroic reflector is positioned to receive laser light in the first waveband from the planar reflector and transmit the laser light in the first waveband towards the planar output surface at the at least approximately 90° angle relative to the planar output surface; and the first planar dichroic reflector is positioned to receive laser light in the second waveband from the second laser diode and reflect the laser light in the second waveband towards the planar output surface of the solid volume at an at least approximately 90° angle relative to the planar output surface.

A shape of the solid volume may be a parallelepiped. The shape of the solid volume is a right trapezoidal prism wherein the planar reflector is carried on a surface of the right trapezoidal prism that is oriented at an at least approximately 45° angle relative to the planar input surface of the right trapezoidal prism. The planar reflector may be within the solid volume.

The WHUD may further include: a third laser diode operable to output light in a third waveband, wherein the third waveband is discrete from the first waveband and the second waveband; and a second planar dichroic reflector; wherein the second planar dichroic reflector is transmissive of light in the first waveband, transmissive of light in the second waveband, and reflective of light in the third waveband and oriented parallel to the planar reflector at an at least approximately 45° angle relative to the planar input surface; the first dichroic reflector is positioned to receive laser light in the second waveband from the second laser diode and reflect the laser light in the second waveband through the second planar dichroic reflector towards the output surface; the second planar dichroic reflector is positioned to receive laser light in the second waveband from the first planar dichroic reflector and transmit the laser light in the second waveband through towards the output surface; the second planar dichroic reflector is positioned to receive laser light in the third waveband from the third laser diode and reflect the laser light in the third waveband towards the output surface; and the output surface is oriented to output an aggregate laser beam comprising laser light in the first waveband, the second waveband, and at least the third waveband. The WHUD may further include: a fourth laser diode operable to output light in a fourth waveband, wherein the fourth waveband is discrete from the first waveband, the second waveband, and the third waveband; and a third planar dichroic reflector; wherein the third planar dichroic reflector is transmissive of light in the first waveband, transmissive of light in the second waveband, transmissive of light in the third waveband, and reflective of light in the fourth waveband and oriented parallel to the planar reflector at an at least approximately 45° angle relative to the planar input surface; the second dichroic reflector is positioned to receive laser light in the third waveband from the third laser diode and reflect the laser light in the third waveband through the third planar dichroic reflector towards the output surface; the third planar dichroic reflector is positioned to receive laser light in the third waveband from the second planar dichroic reflector and transmit the laser light in the third waveband through towards the output surface; the third planar dichroic reflector is positioned to receive laser light in the fourth waveband from the fourth laser diode and reflect the laser light in the fourth waveband towards the output surface; and the output surface is oriented to output an aggregate laser beam comprising laser light in the first waveband, the second waveband, the third waveband, and at least the fourth waveband. The first laser diode may be a red laser diode that outputs red laser light and the first waveband may comprise red wavelengths, the second laser diode may be a green laser diode that outputs green laser light and the second waveband may comprise green wavelengths, the third laser diode may be a blue laser diode that outputs blue laser light and the third waveband may comprise blue wavelengths, and the fourth laser diode may be an infrared laser diode that outputs infrared laser light and the fourth waveband may comprise infrared wavelengths, wherein the planar reflector reflects at least red laser light, the first planar dichroic reflector transmits red laser light and reflects green laser light, the second planar dichroic reflector transmits red laser light and green laser light and reflects blue laser light, and the third planar dichroic reflector transmits red laser light, green laser light, and blue laser light and reflects infrared laser light.

The first output surface of the monolithic combiner may include an aperture through which the aggregate beam passes, wherein the aperture shapes the aggregate beam. The aperture may shape the aggregate beam to at least approximately match an area and shape of a reflective surface of the controllable reflector. The aperture may, for example, be elliptical in shape or profile. The first output surface of the monolithic combiner may be etched to create the aperture. Additionally, or alternatively, the first output surface of the monolithic combiner may be printed to create the aperture.

The wearable heads-up display may further include a plate with an aperture, the plate carried by the monolithic combiner and positioned to orient the aperture at the first output surface such that the aperture shapes the aggregate beam. The plate with an aperture may shape the aggregate beam to at least approximately match an area and shape of a reflective surface of the controllable reflector. The aperture may, for example, be elliptical.

The wearable heads-up display may further include: at least a first photodiode; and the monolithic combiner may further include: a second output surface, positioned opposite the first input surface across a width of the solid volume; at least a first beam splitter, the first beam splitter positioned between the at least a first planar dichroic reflector and the first output surface and oriented parallel to the planar reflector and the first planar dichroic reflector; and wherein the first beam splitter transmits a first portion of the aggregate laser beam towards the first output surface and reflects a second portion of the aggregate laser beam through the second output surface towards the first photodiode.

A wearable heads-up display may be summarized as including: a transparent combiner; a support structure that in use is worn on the head of a user, and which positions the transparent combiner within a field of view of the user when the support structure is worn on the head of the user; a laser projector carried by the support structure, the laser projector comprising: a first laser diode operable to output laser light in a first waveband; a second laser diode operable to output laser light in a second waveband, wherein the first waveband is different from the second waveband and the first waveband and second waveband do not overlap; at least a third laser diode operable to output laser light in a third waveband, wherein the third waveband is different from the first waveband and the second waveband and the first waveband, second waveband, and third waveband do not overlap; at least one controllable reflector operable to scan the laser light over the transparent combiner in a field of view of the eye of a user; and a monolithic beam combiner comprising: a solid volume of optically transparent material that includes a first planar input surface, a second planar input surface, and a first output surface, wherein the first planar input surface is oriented and positioned opposite the first output surface across a length of the monolithic beam combiner and the second input surface is positioned and oriented orthogonal to the first input surface, and wherein the first laser diode is positioned and oriented to direct laser light in the first waveband at the first planar input surface at an at least approximately 90° angle, the second laser diode is positioned and oriented to direct laser light in the second waveband at the second planar input surface at an at least approximately 90° angle, and the third laser diode is positioned and oriented to direct laser light in the third waveband at the second planar input surface at an approximately 90° angle; a first planar dichroic reflector within the solid volume, the first planar dichroic reflector transmissive of light in the first waveband and reflective of light in the second waveband and oriented at an at least approximately 45° angle relative to the first planar input surface and the second planar input surface; and at least a second planar dichroic reflector within the solid volume, the second planar dichroic reflector transmissive of light in the first waveband and light in the second waveband, reflective of light in the third waveband, and oriented parallel to the first planar dichroic reflector at an at least approximately 45° angle relative to the first planar input surface and the second planar input surface; wherein: the first dichroic planar reflector is positioned to receive laser light in the first waveband from the first laser diode and transmit the laser light in the first waveband through the at least a second planar dichroic reflector towards the first output surface; the first planar dichroic reflector is positioned to receive laser light in the second waveband from the second laser diode and reflect the laser light in the second waveband through the at least a second planar dichroic reflector towards the first output surface; the second planar dichroic reflector is positioned to receive laser light in the third waveband from the third laser diode and reflect the laser light in the third waveband towards the first output surface; and the first output surface is oriented to output an aggregate laser beam comprising laser light in the first waveband, the second waveband, and at least laser light in the third waveband.

The first output surface of the solid volume may be a planar first output surface that is parallel to the first planar input surface and orthogonal to the second planar input surface, wherein: the first planar dichroic reflector is oriented at an at least approximately 45° angle relative to the planar first output surface; the second planar dichroic reflector is oriented at an at least approximately 45° angle relative to the planar first output surface; the first planar dichroic reflector is positioned to receive laser light in the first waveband from the first laser diode and transmit the laser light in the first waveband towards the second planar dichroic reflector at an at least approximately 90° angle relative to the planar first output surface; the second planar dichroic reflector is positioned to receive laser light in the first waveband from the planar reflector and transmit the laser light in the first waveband towards the planar first output surface at an at least approximately 90° angle relative to the planar first output surface; the first planar dichroic reflector is positioned to receive laser light in the second waveband from the second laser diode and reflect the laser light in the second waveband towards the second planar dichroic reflector at an at least approximately 90° angle relative to the planar first output surface; the second planar dichroic reflector is positioned to receive laser light in the second waveband from the planar reflector and transmit the laser light in the second waveband towards the planar first output surface at an at least approximately 90° angle relative to the planar first output surface; and the second planar dichroic reflector is positioned to receive laser light in the third waveband from the third laser diode and transmit the laser light in the third waveband towards the planar first output surface at an at least approximately 90° angle relative to the planar first output surface.

The shape of the solid volume may be a parallelepiped.

The wearable heads-up display may further include: a fourth laser diode operable to output light in a fourth waveband, wherein the fourth waveband is discrete from the first waveband, the second waveband, and the third waveband; and a third planar dichroic reflector; wherein the third planar dichroic reflector is transmissive of light in the first waveband, transmissive of light in the second waveband, transmissive of light in the third waveband and reflective of light in the fourth waveband and oriented parallel to first planar dichroic reflector and at an at least approximately 45° angle relative to the first planar input surface and the second planar input surface; and wherein the third planar dichroic reflector is positioned to receive laser light in the first waveband, laser light in the second waveband, and laser light in the third waveband from the second planar dichroic reflector and transmit laser light in the first waveband, laser light in the second waveband, and laser light in the third waveband towards the first output surface; the third planar dichroic reflector is positioned to receive laser light in the fourth waveband from the fourth laser diode and transmit the laser light in the fourth waveband towards the first output surface; the first output surface is oriented to output an aggregate laser beam comprising laser light in the first waveband, the second waveband, the third waveband, and the fourth waveband. The first laser diode may be a red laser diode that outputs red laser light and the first waveband comprises red wavelengths, the second laser diode may be a green laser diode that outputs green laser light and the second waveband comprises green wavelengths, the third laser diode may be a blue laser diode that outputs blue laser light and the third waveband comprises blue wavelengths, and the fourth laser diode may be an infrared laser diode that outputs infrared laser light and the fourth waveband comprises infrared wavelengths, and wherein the first planar dichroic reflector transmits red laser light and reflects green laser light, the second planar dichroic reflector transmits red laser light and green laser light and reflects blue laser light, and the third planar dichroic reflector transmits red laser light, green laser light, and blue laser light and reflects infrared laser light.

The first output surface of the monolithic combiner may include an aperture through which the aggregate beam passes, wherein the aperture shapes the aggregate beam. The aperture may shape the aggregate beam to at least approximately match an area and shape of a reflective surface of the controllable reflector. The aperture may be elliptical. The first output surface of the monolithic combiner may be etched to create the aperture. The first output surface of the monolithic combiner may be printed to create the aperture.

The wearable heads-up display may further include a plate with an aperture, the plate carried by the monolithic combiner and positioned to orient the aperture at the first output surface such that the aperture shapes the aggregate beam. The aperture may shape the aggregate beam to at least approximately match an area and shape of a reflective surface of the controllable reflector. The aperture may, for example, be elliptical.

The wearable heads-up display may further include: at least a first photodiode; and the monolithic combiner may further include: a second output surface, positioned opposite the first input surface; at least a first beam splitter, the first beam splitter positioned between the at least a first planar dichroic reflector and the first output surface and oriented parallel to the planar reflector and the first planar dichroic reflector; and wherein the first beam splitter transmits a first portion of the aggregate laser beam towards the first output surface and reflects a second portion of the aggregate laser beam through the second output surface towards the first photodiode.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for beam combining and are particularly well-suited for use in beam combining within laser projectors in wearable heads-up displays.

Figure 1:
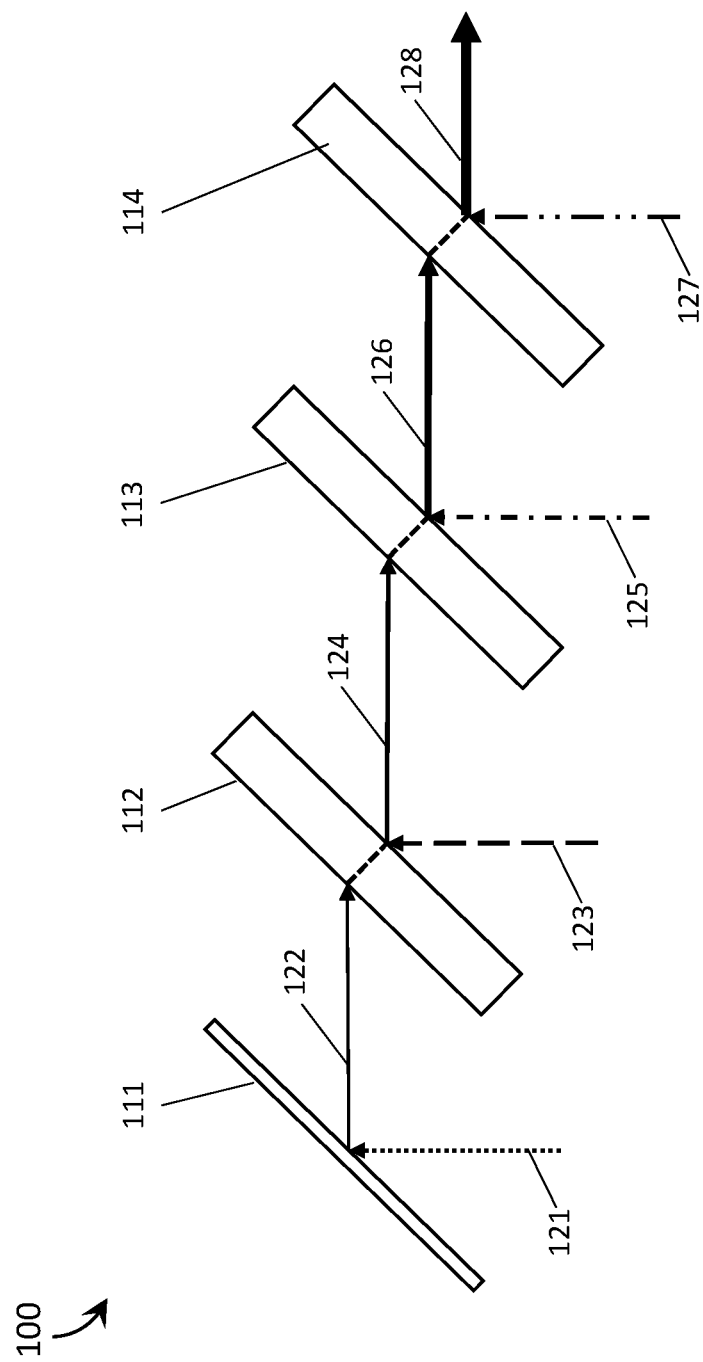
FIG. 1 is a schematic diagram of an exemplary beam combiner.
Figure 2A:
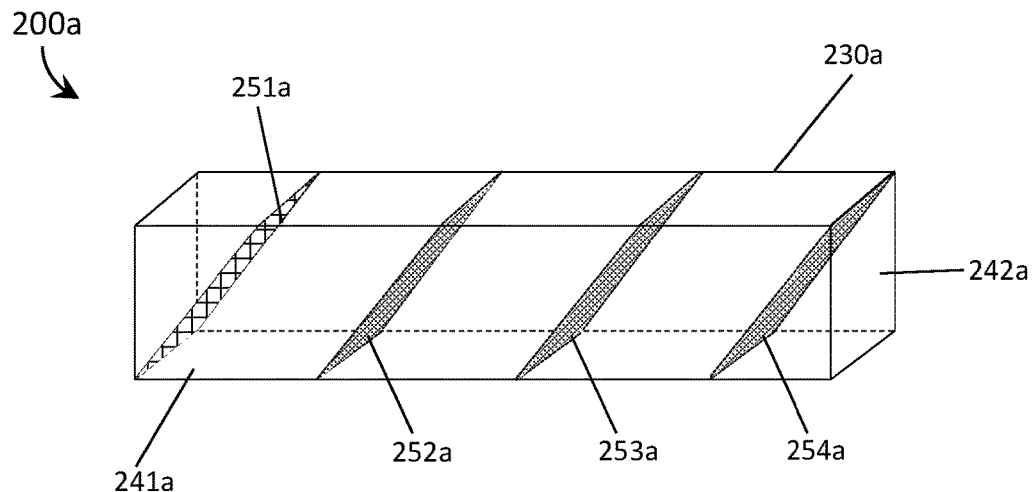
FIG. 2A is an isometric view of a monolithic beam combiner with a rectangular cuboid shape in accordance with the present systems, devices, and methods.

FIG. 2A shows a monolithic beam combiner 200a with a rectangular cuboid shape in accordance with the present systems, devices, and methods. Monolithic beam combiner 200a includes a solid volume of optically transparent material 230a with a rectangular cuboid shape, a planar input surface 241a, a planar output surface 242a, a planar reflector 251a within solid volume 230a, a first planar dichroic reflector 252a within solid volume 230a, a second planar dichroic reflector 253a within solid volume 230a, and a third planar dichroic reflector 254a within solid volume 230a. One or more of planar reflector 251a, first planar dichroic reflector 252a, second planar dichroic reflector 253a, and/or third planar dichroic reflector 254a may, for example, be embedded within solid volume 230a or otherwise formed therein for instance by surface treatments. Planar reflector 251a may, for example, take the form of a mirror, silvered surface, polished surface or other reflector. First planar dichroic reflector 252a, second planar dichroic reflector 253a, and/or third planar dichroic reflector 254a may, for example, take the form of respective dichroic mirrors or other dichroic reflectors. Planar reflector 251a is oriented at an at least approximately 45° angle to planar input surface 241a and planar output surface 242a. First planar dichroic reflector 252a is spaced apart from planar reflector 251a on a longitudinal or principal axis of the rectangular cuboid and is oriented parallel to planar reflector 251a and at an at least approximately 45° angle to planar input surface 241a and planar output surface 242a. Second planar dichroic reflector 253a is spaced apart from first planar dichroic reflector 252a on the longitudinal or principal axis of the rectangular cuboid and is oriented parallel to planar reflector 251a and at an at least approximately 45° angle to planar input surface 241a and planar output surface 242a. Third planar dichroic reflector 254a is spaced apart from second planar dichroic reflector 253a on the longitudinal or principal axis of the rectangular cuboid and is oriented parallel to planar reflector 251a and at an at least approximately 45° angle to planar input surface 241a and planar output surface 242a. The longitudinal or principal axis of the rectangular cuboid is parallel to planar input surface 241a and planar reflector 251a, first planar dichroic reflector 252a, second planar dichroic reflector 253a, and third planar dichroic reflector 254a are each oriented at an at least approximately 45° angle to the longitudinal or principal axis in a first dimension and oriented at an at least approximately 90° angle to the longitudinal or principal axis in a second dimension. Planar reflector 251a, first planar dichroic reflector 252a, second planar dichroic reflector 253a, and third planar dichroic reflector 254a may all be coaxially aligned along an axis parallel to planar input surface 241a. Planar reflector 251a may be reflective of light in all wavelengths or may be a dichroic reflector that reflects only light above or below a cutoff wavelength. First planar dichroic reflector 252a, second planar dichroic reflector 253a, and third dichroic reflector 254a may all comprise a single dichroic layer each having a different cutoff wavelength resulting in reflection and transmission of light in different wavebands at each planar dichroic reflector, or any or all of the planar dichroic reflectors may comprise more than one dichroic layer wherein together the dichroic layers of a single planar dichroic reflector act as a bandpass filter. Because the dichroic reflectors are within solid volume 230a light is not refracted as it passes through each dichroic reflector but instead follows a straight path through the monolithic beam combiner along the longitudinal or principal axis following reflection from the reflective reflector or dichroic reflector the light is initially incident on. Therefore, the dichroic reflectors do not need to be staggered like the dichroic filters in beam combiner 100. This allows for monolithic beam combiner 200a to be more compact than conventional beam combiner 100 of FIG. 1. Monolithic beam combiner 200a represents a preferred embodiment, in which all surfaces of monolithic beam combiner 100a are planar, however, any surfaces of monolithic beam combiner, with the exception of planar input surface 241a, may not be planar. Planar output surface 242a may be perpendicular to planar input surface 241a as shown, or may be parallel to planar input surface 241a. The output surface may not be planar but rather may be curved to act as a lens that converges or diverges the aggregate beam as the aggregate beam exits monolithic beam combiner 200a. Monolithic beam combiner 200a may have an alternate curved shape as discussed above or may include freeform surfaces or monolithic beam combiner 200a may take the form of another parallelepiped other than a rectangular cuboid. Monolithic combiner 200a may include more than three planar dichroic reflectors or as few as one.

In this specification the terms "at least approximately 45° angle" and "at least approximately 90° angle" mean that the orientation of the element or the incident angle of the light being referred to is within +/−5% of that angle.

Figure 2B:
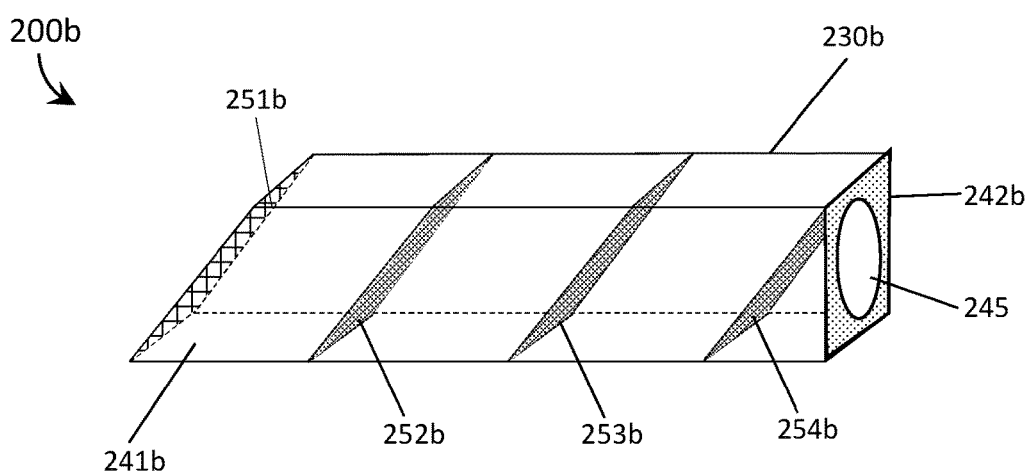
FIG. 2B is an isometric view of a monolithic beam combiner with a right trapezoidal prism shape in accordance with the present systems, devices, and methods.

FIG. 2B shows a monolithic beam combiner 200b with a right trapezoidal prism shape in accordance with the present systems, devices, and methods. Monolithic beam combiner 200b is similar to monolithic combiner 200a and includes a solid volume of optically transparent material 230b with a right trapezoidal prism shape, a planar input surface 241b, a planar output surface 242b, a planar reflector 251b physically coupled to solid volume 230b, a first planar dichroic reflector 252b within solid volume 230b, a second planar dichroic reflector 253b within solid volume 230b, and a third planar dichroic reflector 254b within solid volume 230b. Planar output surface 242b includes an aperture 245 through which light will exit solid volume 230. Aperture 245 may shape the aggregate beam to have a specific size and shape or may shape the aggregate beam to crop the light such that only light of a greater power exits solid volume 330. In FIG. 2B, the aperture is included directly in planar output surface 242b by etching of the surface around the aperture. In other implementations, the aperture may be created by the addition of a plate which includes an aperture by gluing or other means of bonding the plate to planar output surface 242b, by applying a film or which includes an aperture to planar output surface 242b, or by printing the aperture directly onto planar output surface 242b. In FIG. 2B, the aperture is elliptical but may be other shapes in other implementations. The right trapezoidal shape minimizes the size of monolithic beam combiner 200b compared to monolithic combiner 200a of FIG. 2A. Planar reflector 251b is oriented at an at least approximately 45° angle to planar input surface 241b and planar output surface 242b. Planar reflector 251b is at the face of the right trapezoidal prism that is not parallel or perpendicular to any of the other faces. Planar reflector 251b may be carried on the surface of the solid volume of optically transparent material, as shown, or may be within the solid volume. Localizing planar reflector 251b within solid volume 230b may minimize the risk of damage to the planar reflector if monolithic beam combiner 200b is used in an apparatus such as a laser projector. First planar dichroic reflector 252b is spaced apart from planar reflector 251b on the longitudinal or principal axis of the right trapezoidal prism and is oriented parallel to planar reflector 251b and at an at least approximately 45° angle to planar input surface 241b and planar output surface 242b. Second planar dichroic reflector 253b is spaced apart from first planar dichroic reflector 251b on the longitudinal or principal axis of the right trapezoidal prism and is oriented parallel to planar reflector 251b and at an at least approximately 45° angle to planar input surface 241b and planar output surface 242b. Third planar dichroic reflector 254b is spaced apart from second planar dichroic reflector 253b on the longitudinal or principal axis of the right trapezoidal prism and is oriented parallel to planar reflector 251b and at an at least approximately 45° angle to planar input surface 241b and planar output surface 242b. The longitudinal axis of the right trapezoidal prism is parallel to planar input surface 241b and planar reflector 251b, first planar dichroic reflector 252b, second planar dichroic reflector 253b, and third planar dichroic reflector 254b are each oriented at an at least approximately 45° angle to the longitudinal or principal axis in a first dimension and oriented at an at least approximately 90° angle to the longitudinal or principal axis in a second dimension. Planar reflector 251b, first planar dichroic reflector 252b, second planar dichroic reflector 253b, and third planar dichroic reflector 254b may all be coaxially aligned along an axis parallel to planar input surface 241b. Planar reflector 251b may be reflective of light in all wavelengths or may be a dichroic reflector that reflects only light above or below a cutoff wavelength. First planar dichroic reflector 252b, second planar dichroic reflector 253b, and third dichroic reflector 254b may all comprise a single dichroic layer each having a different cutoff wavelength resulting in reflection and transmission of light in different wavebands at each planar dichroic reflector, or any or all of the planar dichroic reflectors may comprise more than one dichroic layer wherein together the dichroic layers of a single planar dichroic reflector act as a bandpass filter. Because the dichroic reflectors are within solid volume 230b, light is not refracted as it passes through each dichroic reflector but instead follows a straight path through the monolithic beam combiner along the longitudinal or principal axis following reflection from the reflective reflector or dichroic reflector the light is initially incident on. Therefore, the dichroic reflectors do not need to be staggered like the dichroic filters in beam combiner 100. This allows for monolithic beam combiner 200b to be more compact than conventional beam combiner 100 of FIG. 1. Monolithic beam combiner 200b represents a preferred embodiment, in which all surfaces of monolithic beam combiner 200b are planar, however, any surfaces of monolithic beam combiner, with the exception of planar input surface 241b, may not be planar. Planar output surface 242b may be perpendicular to planar input surface 241b as shown or may be parallel to planar input surface 241b. The output surface may not be planar but may be curved to act as a lens that converges or diverges the aggregate beam as it exits monolithic beam combiner 200b.

Figure 3:
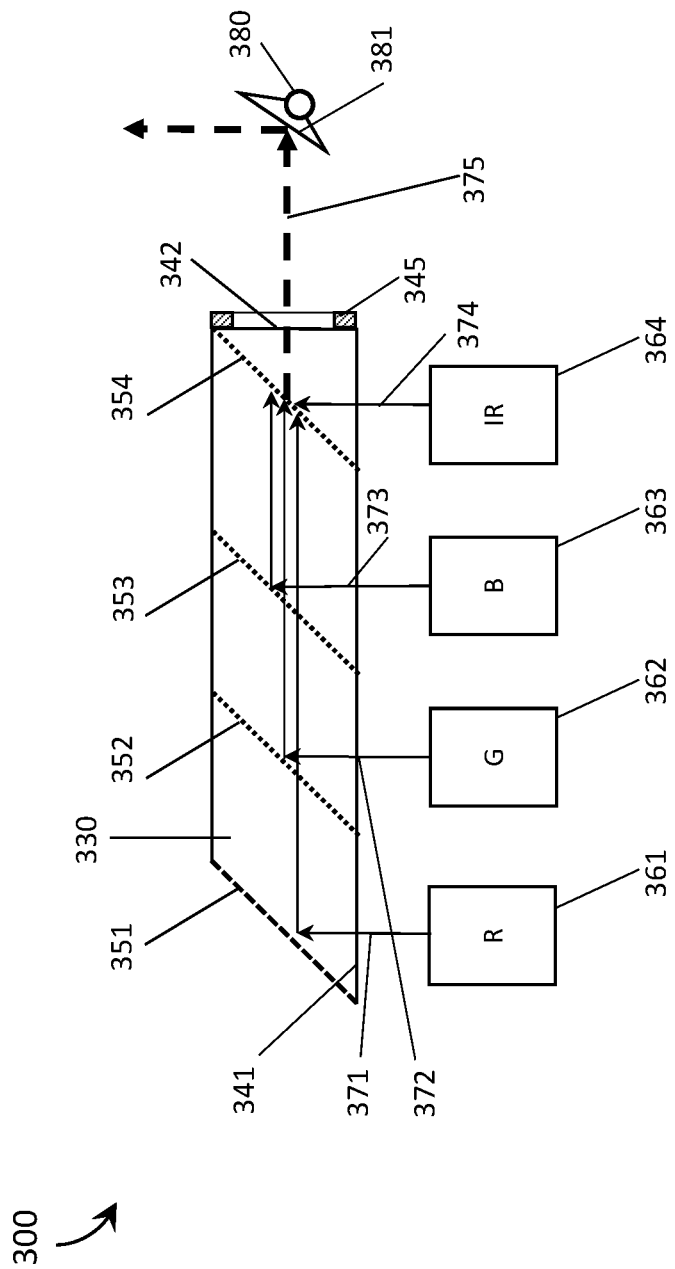
FIG. 3 is a schematic diagram of a laser projector with a monolithic beam combiner in accordance with the present systems devices and methods.

FIG. 3 shows a laser projector 300 with a monolithic beam combiner in accordance with the present systems devices and methods. Laser projector 300 includes four laser diodes 361, 362, 363, and 364, controllable mirror 380 with a reflective surface 381, a plate 345 with an aperture, and a monolithic beam combiner comprising: a solid volume of optically transparent material 330, a planar input surface 341, a planar output surface 342, a planar reflector 351 physically coupled to solid volume 330, a first planar dichroic reflector 352 within in solid volume 330, a second planar dichroic reflector 353 within solid volume 330, and a third planar dichroic reflector 354 within solid volume 330. Plate 345 is carried by solid volume 330 at planar output surface 342. Laser diode 361 is a red laser diode and generates, emits or outputs laser light in a first waveband which comprises red wavelengths. Laser diode 362 is a green laser diode and generates, emits or outputs laser light in a second waveband which comprises green wavelengths. Laser diode 363 is a blue laser diode and generates, emits or outputs laser light in a third waveband which comprises blue wavelengths. Laser diode 364 is an infrared laser diode and generates, emits or outputs laser light in a fourth waveband which comprises infrared wavelengths. The monolithic beam combiner is identical to monolithic beam combiner 200b and has a right trapezoidal shape, however, the monolithic beam combiner could have the shape of a parallelepiped, such as a rectangular cuboid, or could have a shape where some of the surfaces are curved or freeform. Planar reflector 351, first planar dichroic reflector 352, second planar dichroic reflector 353, and third planar dichroic reflector 354 are parallel and spaced apart from one another on the longitudinal or principal axis of solid volume 330. Each reflector is oriented at an at least approximately 45° angle to the longitudinal or principal axis in a first dimension and oriented at an at least approximately 90° angle to the longitudinal or principal axis in a second dimension, and each reflector is oriented at an at least approximately 45° angle to both planar input surface 341 and planar output surface 342. In FIG. 3, planar reflector 351 is carried on the surface of solid volume 330, however, planar reflector 351 may be within the solid volume. Planar reflector 351 is reflective of light in the first waveband (i.e., red laser light). First planar dichroic reflector 352 is reflective of light in the second waveband (i.e., green laser light) and transmissive of light in the first waveband (i.e., red laser light). Second planar dichroic reflector 353 is reflective of light in the third waveband (i.e., blue laser light) and transmissive of light in the first waveband (i.e., red laser light) and the second waveband (i.e., green laser light). Third planar dichroic reflector 353 is reflective of light in the fourth waveband (i.e., infrared laser light) and transmissive of light in the first waveband (i.e., red laser light), light in the second waveband (i.e., green laser light), and light in the third waveband (i.e., blue laser light). First planar dichroic reflector 352, second planar dichroic reflector 353, and third dichroic reflector 354 may all comprise a single dichroic layer each having a different cutoff wavelength resulting in reflection and transmission of light in different wavebands at each planar dichroic reflector, or any or all of the planar dichroic reflectors may comprise more than one dichroic layer wherein together the dichroic layers of a single planar dichroic reflector act as a bandpass filter. Laser projector 300 operates as follows. Red laser diode 361 generates red laser light 371. Red laser light 371 passes through planar input surface 341 at an at least approximately 90° angle and impinges on planar reflector 351 at an at least approximately 45° angle. In FIG. 3, laser light incident on reflectors is represented by single arrows, however, in a preferred embodiment of the monolithic beam combiner the spot size of the laser beam would fill the reflector in at least one dimension and there would be no loss of laser light in any dimension. For example, if the spot size of the beam were elliptical with a height of 200 µm and a width of 100 µm, the height of the reflector should be approximately 200 µm (within 5%) and the width at least 100 µm. This minimizes the size of the reflectors and therefore the overall size of the monolithic beam combiner and minimizes inefficient loss of laser light. The reflectors may be any shape (e.g. square, circular, elliptical), but in a preferred embodiment the shape of the reflector would closely approximate the shape and size of the spot size of the laser beam to minimize the size of the monolithic combiner. Planar reflector 351 may be carried on the surface of the solid volume of optically transparent material, as shown, or may be located within the solid volume. Planar reflector 351 may be a reflective reflector that is reflective of light in all wavelengths or may be a dichroic reflector that reflects only light above or below a cutoff wavelength. Planar reflector 351 reflects red laser light 371 towards first planar dichroic reflector 352. First planar dichroic reflector 352 transmits red laser light 371 (only first arrows are labelled to reduce clutter) towards second planar dichroic reflector 353. Green laser diode 362 generates green laser light 372 which passes through planar input surface 341 at an at least approximately 90° angle and is incident on first planar dichroic reflector 352 at an at least approximately 45° angle. First planar dichroic reflector 352 reflects green laser light 372 towards second planar dichroic reflector 353. In this way, red laser light 371 and green laser light 372 are combined (the red laser light and green laser light are shown as separate arrows for clarity). Second planar dichroic reflector 353 transmits red laser light 361 and green laser light 362 towards third planar dichroic reflector 354. Blue laser diode 362 generates blue laser light 373 which passes through planar input surface 341 at an at least approximately 90° angle is incident on second planar dichroic reflector 353 at an at least approximately 45° angle. Second planar dichroic reflector 353 reflects blue laser light 373 towards third dichroic reflector. In this way, blue laser light 373 is combined with red laser light 371 and green laser light 372 (shown as separate arrows for clarity). Infrared laser diode 364 generates infrared laser light 374 which passes through planar input surface 341 at an at least approximately 90° angle and is incident on third planar dichroic reflector 354 at an at least approximately 45° angle. Third planar dichroic reflector 354 transmits red laser light 371, green laser light 372, and blue laser light 373 towards planar output surface 342. Third planar dichroic reflector 354 reflects infrared laser light 374 towards planar output surface 342. In this way, infrared laser light 374 is combined with red laser light 371, green laser light 372, and blue laser light 373 into aggregate beam 375. Aggregate beam 375 passes through planar output surface 342 and plate 345 at an at least approximately 90° angle and is incident on controllable reflector 380. Plate 345 includes an aperture (white area) which shapes the aggregate beam after it passes through planar output surface 342. That is, light from aggregate beam 375 which is incident on any part of the plate which is not the aperture (patterned lined areas) is blocked by the plate and is not incident on controllable mirror 380. The aperture shapes the aggregate beam to at least approximately match an area and shape of reflective surface 381 of controllable reflector 380. That is, the aperture may shape the beam to have a spot size that is no more than 5% larger or smaller than the reflective surface of the mirror. The specific measurement of approximately matching the reflective surface may depend on the size, shape, and/or range of motion of the controllable mirror and may be at least +/−5%, at least +/−10%, or at least +/−25%.

Controllable reflector 380 scans the aggregate beam indirectly or directly onto a projection surface. In another implementation, the output surface may not be planar but rather may be curved to act as a lens that converges or diverges light exiting the monolithic combiner. In another implementation, the third planar dichroic reflector may reflect the laser light from the second planar dichroic reflector and transmits the laser light generated by the fourth laser diode. The output surface of the monolithic combiner would be opposite the input surface and may be planar such that the aggregate beam passes through the output surface at an at least approximately 90° angle or may be curved as discussed above. The output of light from the laser diodes may be modulated via signals produced by a processor (i.e., hardware circuitry, e.g., an integrated circuit), and the processor may be communicatively coupled to a non-transitory processor-readable storage medium that stores processor-executable data and/or instructions. In other implementations, the number, type, and output wavelength of light sources may be different.

Figure 4:
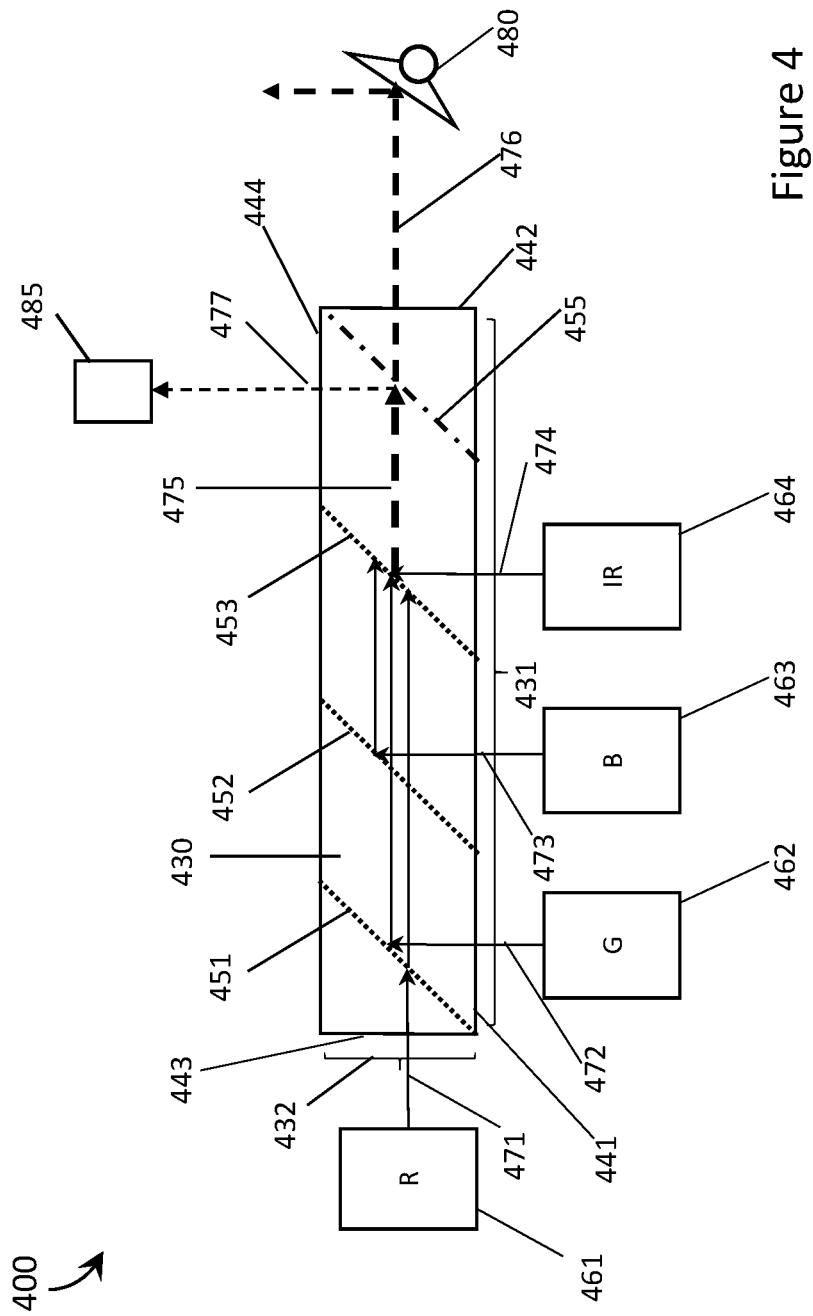
FIG. 4 is a schematic diagram of a laser projector with a monolithic combiner, a beam splitter, and a photodiode in accordance with the present systems devices and methods.

FIG. 4 is a schematic diagram of another embodiment of a laser projector with a monolithic combiner, a beam splitter, and a photodiode in accordance with the present systems devices and methods. Laser projector 400 includes four laser diodes 461, 462, 463, and 464, controllable mirror 480, a photodiode 485, and a monolithic beam combiner comprising: a solid volume of optically transparent material 430, a first planar input surface 441, a second planar input surface 443, a first planar output surface 442, a second planar output surface 444, a first planar dichroic reflector 451 within solid volume 430, a second planar dichroic reflector 452 within solid volume 430, a third planar dichroic reflector 453 within solid volume 430, and a beam splitter 455 within solid volume 430. First planar output surface 442 is positioned opposite second planar input surface 443 across a length 431 of solid volume 430 and first planar input surface 441 is positioned opposite second planar output surface 444 across a width 432 of solid volume 430. Laser diode 461 is a red laser diode and generates, emits or outputs laser light in a first waveband which comprises red wavelengths. Laser diode 462 is a green laser diode and generates, emits or outputs laser light in a second waveband which comprises green wavelengths. Laser diode 463 is a blue laser diode and generates, emits or outputs laser light in a third waveband which comprises blue wavelengths. Laser diode 464 is an infrared laser diode and generates, emits or outputs laser light in a fourth waveband which comprises infrared wavelengths. The monolithic beam combiner is similar to monolithic beam combiner 200a and has a rectangular cuboid shape. First planar dichroic reflector 451, second planar dichroic reflector 452, third planar dichroic reflector 453, and beam splitter 455 are parallel and spaced apart from one another on the longitudinal or principal axis of solid volume 430. Each reflector/splitter is oriented at an at least approximately 45° angle to the longitudinal or principal axis in a first dimension and oriented at an at least approximately 90° angle to the longitudinal or principal axis in a second dimension, and each reflector is oriented at an at least approximately 45° angle to each of first planar input surface 441, second planar input surface 442, first planar output surface 442, and second planar output surface 444. First planar dichroic reflector 451 is transmissive of light in the first waveband (i.e., red laser light) and reflective of light in the second waveband (i.e., green laser light). Second planar dichroic reflector 452 is reflective of light in the third waveband (i.e., blue laser light) and transmissive of light in the first waveband (i.e., red laser light) and the second waveband (i.e., green laser light). Third planar dichroic reflector 453 is reflective of light in the fourth waveband (i.e., infrared laser light) and transmissive of light in the first waveband (i.e., red laser light), light in the second waveband (i.e., green laser light), and light in the third waveband (i.e., blue laser light). First planar dichroic reflector 451, second planar dichroic reflector 452, and third dichroic reflector 453 may all comprise a single dichroic layer each having a different cutoff wavelength resulting in reflection and transmission of light in different wavebands at each planar dichroic reflector, or any or all of the planar dichroic reflectors may comprise more than one dichroic layer wherein together the dichroic layers of a single planar dichroic reflector act as a bandpass filter.

Laser projector 400 operates as follows. Red laser diode 461 generates red laser light 471. Red laser light 471 passes through second planar input surface 443 at an at least approximately 90° angle and impinges on first planar dichroic reflector 451 at an at least approximately 45° angle. In FIG. 4, laser light incident on reflectors is represented by single arrows, however, in a preferred embodiment of the monolithic beam combiner the spot size of the laser beam would fill the reflector in at least one dimension and there would be no loss of laser light in any dimension. For example, if the spot size of the beam were elliptical with a height of 200 μm and a width of 100 μm, the height of the reflector should be approximately 200 μm (within 5%) and the width at least 100 μm. This minimizes the size of the reflectors and therefore the overall size of the monolithic beam combiner and minimizes inefficient loss of laser light. The reflectors may be any shape (e.g. square, circular, elliptical), but in a preferred embodiment the shape of the reflector would closely approximate the shape and size of the spot size of the laser beam to minimize the size of the monolithic combiner. First planar dichroic reflector 451 transmits red laser light 471 towards second planar dichroic reflector 452. Green laser diode 462 generates green laser light 472 which passes through first planar input surface 441 at an at least approximately 90° angle and is incident on first planar dichroic reflector 451 at an at least approximately 45° angle. First planar dichroic reflector 451 reflects green laser light 472 towards second planar dichroic reflector 452. In this way, red laser light 471 and green laser light 472 are combined (the red laser light and green laser light are shown as separate arrows for clarity). Second planar dichroic reflector 452 transmits red laser light 461 and green laser light 462 towards third planar dichroic reflector 453. Blue laser diode 463 generates blue laser light 473 which passes through first planar input surface 441 at an at least approximately 90° angle and is incident on second planar dichroic reflector 452 at an at least approximately 45° angle. Second planar dichroic reflector 452 reflects blue laser light 473 towards third dichroic reflector 453. In this way, blue laser light 473 is combined with red laser light 471 and green laser light 472 (shown as separate arrows for clarity). Infrared laser diode 464 generates infrared laser light 474 which passes through first planar input surface 441 at an at least approximately 90° angle and is incident on third planar dichroic reflector 453 at an at least approximately 45° angle. Third planar dichroic reflector 453 transmits red laser light 471, green laser light 472, and blue laser light 473 towards first planar output surface 442. Third planar dichroic reflector 453 reflects infrared laser light 474 towards first planar output surface 442. In this way, infrared laser light 474 is combined with red laser light 471, green laser light 472, and blue laser light 473 into aggregate beam 475. Aggregate beam 475 is incident on beam splitter 455. Beam splitter 455 splits aggregate beam 475 into a first portion of light 476 and a second portion of light 475. First portion of light 476 is transmitted through beam splitter 455 towards first planar output surface 442. First portion of light 476 passes through first planar output surface 442 at an at least approximately 90° angle and is incident on controllable reflector 480. Controllable reflector 480 scans the aggregate beam indirectly or directly onto a projection surface. In another implementation, the output surface may not be planar but rather may be curved to act as a lens that converges or diverges light exiting the monolithic combiner. Second portion of light 477 is reflected by beam splitter 455 towards second planar output surface 444. Second portion of light 477 passes through second planar output surface 444 and is incident on photodiode 485. Photodiode 485 may measure a characteristic of the aggregate beam as represented by first portion of light 477, including but not limited to: the power of the light, the luminosity of the light, or the color of the light. In another implementation, controllable mirror 480 may be positioned to receive light which passes through second output surface 444 and photodiode 485 may be positioned to receive light which passes through first output surface 442. In other implementations more than one beam splitter may be positioned between the planar dichroic reflector which is closest to the first planar output surface and the first planar output surface, wherein each beam splitter directs a portion of the aggregate beam to a respective photodiode which measures a characteristic of the aggregate beam. The output of light from the laser diodes may be modulated via signals produced by a processor (i.e., hardware circuitry, e.g., an integrated circuit), and the processor may be communicatively coupled to a non-transitory processor-readable storage medium that stores processor-executable data and/or instructions. In implementations with at least one beam splitter and at least one photodiode, the photodiode may be communicatively coupled to the processor, and data/information about the light may be used to monitor the safety of the WHUD, as in. In other implementations, the number, type, and output wavelength of light sources may be different. The order of laser diodes as red, green, blue, and then infrared is for exemplary purposes and the laser diodes may be organized in any suitable way.

Figure 5:
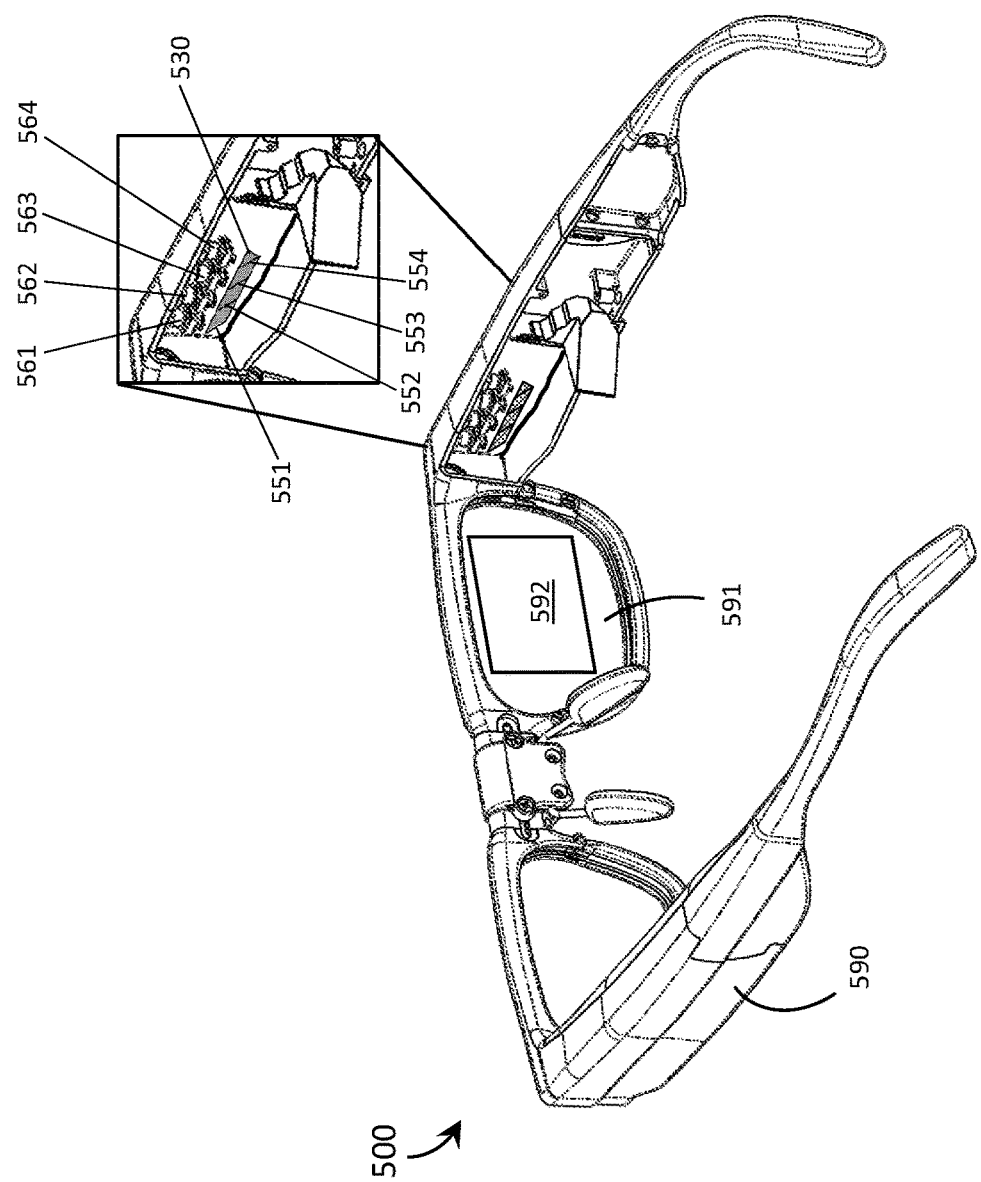
FIG. 5 is an isometric view of a wearable heads-up display with a monolithic beam combiner, with a detailed view of a portion thereto, in accordance with the present systems devices and methods.

FIG. 5 shows a wearable heads-up display (WHUD) 500 with a monolithic beam combiner in accordance with the present systems devices and methods. WHUD 500 includes a support structure 590 carrying: an eyeglass lens 591 with a transparent combiner 592, and a laser projector. Transparent combiner 592 positions within a field of view of a user when the support structure is worn on the head of the user. Support structure 590 has the general shape and appearance of an eyeglasses frame. The laser projector is similar or even identical to laser projector 300 of FIG. 3 and includes: laser diodes 561, 562, 563, and 564, at least one controllable reflector (not shown), and a monolithic beam combiner. The monolithic combiner is similar or even identical to monolithic combiner 200b of FIG. 2 and the monolithic combiner of FIG. 3 and comprises a solid volume of optically transparent material 530, a planar input surface (not called out), a planar output surface (not called out), a planar reflector 551 physically coupled to solid volume 530, a first dichroic reflector 552 within solid volume 530, a second dichroic reflector 553 within solid volume 530, and a third dichroic reflector 554 within solid volume 530. The monolithic combiner has a right trapezoidal prism shape but could be a parallelepiped, such as a rectangular cuboid, or could have a shape where some of the surfaces are curved or freeform. Laser diode 561 is a red laser diode and generates laser light in a first waveband which comprises red wavelengths. Laser diode 562 is a green laser diode and generates laser light in a second waveband which comprises green wavelengths. Laser diode 563 is a blue laser diode and generates laser light in a third waveband that comprises blue wavelengths. Laser diode 564 is an infrared laser diode and generates laser light in a fourth waveband that comprises infrared wavelengths. The generation of light by the laser diodes may be modulated via signals produced by a processor (i.e., hardware circuitry, e.g., an integrated circuit), and the processor may be communicatively coupled to a non-transitory processor-readable storage medium that stores processor-executable data and/or instructions. In other implementations, the number, type, and output wavelength of light sources may be different. Planar reflector 551 reflects red laser light, first planar dichroic reflector 552 reflects green laser light and transmits red laser light, second planar dichroic reflector 553 reflects blue laser light and transmits red laser light and green laser light, and third planar dichroic reflector 554 reflects infrared laser light and transmits red laser light, green laser light, and blue laser light. WHUD 500 operates as follows. Laser diode 561 generates red laser light which passes through the planar input surface of the monolithic beam combiner at an at least approximately 90° angle and is incident on planar reflector 551 at an at least approximately 45° angle. Planar reflector 551 reflects the red laser light toward first planar dichroic reflector 552. First planar dichroic reflector 552 transmits the red laser light towards second planar dichroic reflector 553. Laser diode 562 generates green laser light which passes through the planar input surface at an at least approximately 90° angle and is incident on first planar dichroic reflector 552 at an at least approximately 45° angle. First planar dichroic reflector 552 reflects the green laser light toward second planar dichroic reflector 553. Second planar dichroic reflector 553 transmits the red laser light and the green laser light towards third planar dichroic reflector 554. Laser diode 563 generates blue laser light which passes through the planar input surface at an at least approximately 90° angle and is incident on second planar dichroic reflector 553 at an at least approximately 45° angle. Second planar dichroic reflector 553 reflects the blue laser light toward third planar dichroic reflector 554. Third planar dichroic reflector 554 transmits the red laser light, the green laser light, and the blue laser light towards the planar output surface of the monolithic beam combiner. Laser diode 564 generates infrared laser light which passes through the planar input surface at an at least approximately 90° angle and is incident on third planar dichroic reflector 554 at an at least approximately 45° angle. Third planar dichroic reflector 553 reflects the infrared laser light towards the planar output surface of the monolithic beam combiner. An aggregate beam comprising red laser light, green laser light, blue laser light, and infrared laser light is incident on the planar output surface at an at least approximately 90° angle. The monolithic beam combiner is oriented such that the aggregate beam is directed towards the at least one controllable reflector. Because the dichroic reflectors are located within solid volume 530 light is not refracted as it passes through each dichroic reflector but instead follows a straight path through the monolithic beam combiner along the longitudinal or principal axis following reflection from the reflective reflector or dichroic reflector the light is initially incident on. Therefore, the dichroic reflectors do not need to be staggered like the dichroic filters in conventional beam combiner 100. This allows for monolithic beam combiner 200a to be more compact than conventional beam combiner 100 of FIG. 1.

A person of skill in the art will appreciate that the various embodiments for beam combining in laser projectors described herein may be applied in non-WHUD applications. For example, the present systems, devices, and methods may be applied in non-wearable heads-up displays and/or in other applications that may or may not include a visible display.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

Throughout this specification and the appended claims, the term "carries" and variants such as "carried by" or "carrying" are generally used to refer to a physical coupling between two objects. The physical coupling may be direct physical coupling (i.e., with direct physical contact between the two objects) or indirect physical coupling mediated by one or more additional objects. Thus, the term carries and variants such as "carried by" are meant to generally encompass all manner of direct and indirect physical coupling.

Throughout this specification and the appended claims, the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: US Patent Application Publication No. US 2015-0378161 A1, U.S. Non-Provisional patent application Ser. No. 15/046,234, U.S. Non-Provisional patent application Ser. No. 15/046,254, US Patent Application Publication No. US 2016-0238845 A1, U.S. Non-Provisional patent application Ser. No. 15/145,576, US Non-Provisional patent application Ser. No. 15/145,609, U.S. Non-Provisional patent application Ser. No. 15/145,583, U.S. Non-Provisional patent application Ser. No. 15/256,148, U.S. Non-Provisional patent application Ser. No. 15/167,458, U.S. Non-Provisional patent application Ser. No. 15/167,472, U.S. Non-Provisional patent application Ser. No. 15/167,484, U.S. Provisional Patent Application Ser. No. 62/271,135, U.S. Non-Provisional patent application Ser. No. 15/331,204, US Patent Application Publication No. US 2014-0198034 A1, US Patent Application Publication No. US 2014-0198035 A1, U.S. Non-Provisional patent application Ser. No. 15/282,535, U.S. Provisional Patent Application Ser. No. 62/268,892, U.S. Provisional Patent Application Ser. No. 62/322,128, U.S. Provisional Patent Application Ser. No. 62/420,368, U.S. Provisional Patent Application Ser. No. 62/420,371, U.S. Provisional Patent Application Ser. No. 62/420,380; and U.S. Provisional Patent Application Ser. No. 62/438,725, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display (WHUD) comprising:
a transparent combiner;
a support structure that in use is worn on the head of a user, and which positions the transparent combiner within a field of view of the user when the support structure is worn on the head of the user;
a laser projector carried by the support structure, the laser projector comprising:
a first laser diode operable to output laser light in a first waveband;
a second laser diode operable to output laser light in a second waveband, wherein the first waveband is different from the second waveband and the first waveband and second waveband do not overlap;
at least a third laser diode operable to output laser light in a third waveband, wherein the third waveband is different from the first waveband and the second waveband and the first waveband, second waveband, and third waveband do not overlap;
at least one controllable reflector operable to scan the laser light over the transparent combiner in a field of view of the eye of a user; and
a monolithic beam combiner comprising:
a solid volume of optically transparent material that includes a first planar input surface, a second planar input surface, and a first output surface, wherein the first planar input surface is oriented and positioned opposite the first output surface across a length of the monolithic beam combiner and the second input surface is positioned and oriented orthogonal to the first input surface, and wherein the first laser diode is positioned and oriented to direct laser light in the first waveband at the first planar input surface at an at least approximately 90° angle, the second laser diode is positioned and oriented to direct laser light in the second waveband at the second planar input surface at an at least approximately 90° angle, and the third laser diode is positioned and oriented to direct laser light in the third waveband at the second planar input surface at an approximately 90° angle;
a first planar dichroic reflector within the solid volume, the first planar dichroic reflector transmissive of light in the first waveband and reflective of light in the second waveband and oriented at an at least approximately 45° angle relative to the first planar input surface and the second planar input surface; and
at least a second planar dichroic reflector within the solid volume, the second planar dichroic reflector transmissive of light in the first waveband and light in the second waveband, reflective of light in the third waveband, and oriented parallel to the first planar dichroic reflector at an at least approximately 45° angle relative to the first planar input surface and the second planar input surface; wherein:
the first dichroic planar reflector is positioned to receive laser light in the first waveband from the first laser diode and transmit the laser light in the first waveband through the at least a second planar dichroic reflector towards the first output surface;
the first planar dichroic reflector is positioned to receive laser light in the second waveband from the second laser diode and reflect the laser light in the second waveband through the at least a second planar dichroic reflector towards the first output surface;
the second planar dichroic reflector is positioned to receive laser light in the third waveband from the third laser diode and reflect the laser light in the third waveband towards the first output surface; and
the first output surface is oriented to output an aggregate laser beam comprising laser light in the first waveband, the second waveband, and at least laser light in the third waveband.

2. The WHUD of claim 1 wherein the first output surface of the solid volume is a planar first output surface that is parallel to the first planar input surface and orthogonal to the second planar input surface, and wherein:
the first planar dichroic reflector is oriented at an at least approximately 45° angle relative to the planar first output surface;
the second planar dichroic reflector is oriented at an at least approximately 45° angle relative to the planar first output surface;
the first planar dichroic reflector is positioned to receive laser light in the first waveband from the first laser diode and transmit the laser light in the first waveband towards the second planar dichroic reflector at an at least approximately 90° angle relative to the planar first output surface;

the second planar dichroic reflector is positioned to receive laser light in the first waveband from the planar reflector and transmit the laser light in the first waveband towards the planar first output surface at an at least approximately 90° angle relative to the planar first output surface;

the first planar dichroic reflector is positioned to receive laser light in the second waveband from the second laser diode and reflect the laser light in the second waveband towards the second planar dichroic reflector at an at least approximately 90° angle relative to the planar first output surface;

the second planar dichroic reflector is positioned to receive laser light in the second waveband from the planar reflector and transmit the laser light in the second waveband towards the planar first output surface at an at least approximately 90° angle relative to the planar first output surface; and the second planar dichroic reflector is positioned to receive laser light in the third waveband from the third laser diode and transmit the laser light in the third waveband towards the planar first output surface at an at least approximately 90° angle relative to the planar first output surface.

3. The WHUD of claim 1 wherein the shape of the volume is a parallelepiped.

4. The WHUD of claim 1 further comprising:
a fourth laser diode operable to output light in a fourth waveband, wherein the fourth waveband is discrete from the first waveband, the second waveband, and the third waveband; and
a third planar dichroic reflector; wherein
the third planar dichroic reflector is transmissive of light in the first waveband, transmissive of light in the second waveband, transmissive of light in the third waveband and reflective of light in the fourth waveband and oriented parallel to first planar dichroic reflector and at an at least approximately 45° angle relative to the first planar input surface and the second planar input surface; and wherein
the third planar dichroic reflector is positioned to receive laser light in the first waveband, laser light in the second waveband, and laser light in the third waveband from the second planar dichroic reflector and transmit laser light in the first waveband, laser light in the second waveband, and laser light in the third waveband towards the first output surface;
the third planar dichroic reflector is positioned to receive laser light in the fourth waveband from the fourth laser diode and transmit the laser light in the fourth waveband towards the first output surface;
the first output surface is oriented to output an aggregate laser beam comprising laser light in the first waveband, the second waveband, the third waveband, and the fourth waveband.

5. The WHUD of claim 4 wherein the first laser diode is a red laser diode that outputs red laser light and the first waveband comprises red wavelengths, the second laser diode is a green laser diode that outputs green laser light and the second waveband comprises green wavelengths, the third laser diode is a blue laser diode that outputs blue laser light and the third waveband comprises blue wavelengths, and the fourth laser diode is an infrared laser diode that outputs infrared laser light and the fourth waveband comprises infrared wavelengths, and wherein the first planar dichroic reflector transmits red laser light and reflects green laser light, the second planar dichroic reflector transmits red laser light and green laser light and reflects blue laser light, and the third planar dichroic reflector transmits red laser light, green laser light, and blue laser light and reflects infrared laser light.

6. The WHUD of claim 1 wherein the first output surface of the monolithic combiner includes an aperture through which the aggregate beam passes, wherein the aperture shapes the aggregate beam.

7. The WHUD of claim 6 wherein the aperture shapes the aggregate beam to at least approximately match an area and shape of a reflective surface of the controllable reflector.

8. The WHUD of claim 6 wherein the aperture is elliptical.

9. The WHUD of claim 6 wherein the first output surface of the monolithic combiner is etched to create the aperture.

10. The WHUD of claim 6 wherein the first output surface of the monolithic combiner is printed to create the aperture.

11. The WHUD of claim 1 wherein the WHUD further includes a plate with an aperture, the plate carried by the monolithic combiner and positioned to orient the aperture at the first output surface such that the aperture shapes the aggregate beam.

12. The WHUD of claim 11 wherein the aperture shapes the aggregate beam to at least approximately match an area and shape of a reflective surface of the controllable reflector.

13. The WHUD of claim 11 wherein the aperture is elliptical.

14. The WHUD of claim 1 wherein the WHUD further comprises:
at least a first photodiode; and
the monolithic combiner further includes:
a second output surface, positioned opposite the first input surface;
at least a first beam splitter, the first beam splitter positioned between the at least a first planar dichroic reflector and the first output surface and oriented parallel to the planar reflector and the first planar dichroic reflector; and wherein
the first beam splitter transmits a first portion of the aggregate laser beam towards the first output surface and reflects a second portion of the aggregate laser beam through the second output surface towards the first photodiode.

* * * * *